(12) United States Patent
Wang et al.

(10) Patent No.: US 9,755,793 B2
(45) Date of Patent: Sep. 5, 2017

(54) HETEROGENEOUS NETWORK INTEGRATING DEVICE AND METHOD THEREOF

(71) Applicant: Chunghwa Telecom Co., Ltd., Yangmei, Taoyuan County (TW)

(72) Inventors: Chung-Ho Wang, Yangmei (TW); Chia-Horng Liu, Yangmei (TW); Sz-Hsien Wu, Yangmei (TW)

(73) Assignee: CHUNGWA TELECOM CO., LTD., Yangmei, Taoyuan County (TW)

( * ) Notice: Subject to any disclaimer, the term of this patent is extended or adjusted under 35 U.S.C. 154(b) by 0 days.

(21) Appl. No.: 15/269,062

(22) Filed: Sep. 19, 2016

(65) Prior Publication Data
US 2017/0086088 A1  Mar. 23, 2017

(30) Foreign Application Priority Data

Sep. 18, 2015  (TW) .............................. 104130884 A

(51) Int. Cl.
 H04W 72/00  (2009.01)
 H04L 5/00  (2006.01)
 H04L 12/24  (2006.01)

(52) U.S. Cl.
 CPC ................ H04L 5/00 (2013.01); H04L 41/00 (2013.01)

(58) Field of Classification Search
 None
 See application file for complete search history.

(56) References Cited

U.S. PATENT DOCUMENTS

2013/0242897 A1* 9/2013 Meylan ................ H04W 28/16
 370/329
2013/0322347 A1 12/2013 Alex et al.

* cited by examiner

Primary Examiner — Moustapha Diaby
(74) Attorney, Agent, or Firm — Muncy, Geissler, Olds & Lowe, P.C.

(57) ABSTRACT

A heterogeneous network integrating device and method thereof are provided. The device and method are applied in a communication environment overlapped by a mobile network covering range and a wireless network covering range and using the mobile network and wireless network to transmit downlink traffic. The heterogeneous network terminal enables the mobile network air interface and wireless network air interface at the same time when transmitting the downlink traffic and requests the mobile network end to transmit by the mobile network and wireless network at the same time. The mobile network end assigns the downlink traffic of the heterogeneous network integration terminal to the mobile network and the wireless network. This uses the bandwidth feature of mobile network and wireless network to promote transmission rate of downlink traffic and shorten user waiting time.

21 Claims, 4 Drawing Sheets

| 301 | 302 | 303 | 304 | 305 |
|---|---|---|---|---|
| MAC Destination | MAC Source | Ethertype | Payload | Frame check sequence |

FIG.3

| 401 | 402 | 403 | 404 | 405 |
|---|---|---|---|---|
| wireless network Layer 2 identification address | cable network Layer 2 identification address of the heterogeneous network router | heterogeneous network integration identification code | downlink traffic | frame check sequence |

FIG.4

HETEROGENEOUS NETWORK INTEGRATING DEVICE AND METHOD THEREOF

CROSS-REFERENCE TO RELATED APPLICATIONS

This application claims priority of application Ser. No. 104130884, filed in Taiwan on Sep. 18, 2015, under 35 U.S.C. §119, the contents of which are hereby incorporated by reference.

BACKGROUND OF THE INVENTION

1. Field of the Invention

The invention relates to a heterogeneous network integrating method and device that will establish the technology to use both mobile network and wireless network for downlink traffic in environments where there is an overlap in the scopes of both networks. More particularly, the heterogeneous network router is able to use the wireless router to transmit the downlink traffic of the mobile network via wireless network to the heterogeneous network integration terminal so as to facilitate the simultaneous downlink traffic of the mobile and wireless networks. The invention can be applied in interne application and services.

2. Brief Description of the Prior Art

A traditional wireless transmission only uses a single wireless communication system for data transmission, and the speed of the data transmission will therefore depend solely on the specification and transmission capacities of the wireless communication device. For example, the fastest downlink speed of the 3G WCDMA is 2 Mbps, the 3.5G DC-HSPA+ is at 42 Mbps, the 3.9G LTE Category 4 20 MHz bandwidth is at 150 Mbps, the 4G LTE-A Category 8 is at 3 Gbps and the Wi-Fi 802.11ac wave 2 is at 3.5 Gbps. In response to big data transmission demands of the increasingly rich and high definition multimedia content, the network capacity and transmission speeds must also continue to increase. The technology for increasing network capacity and transmission rate can be classified into the three following directions:

1. Increasing the network bandwidth. For example, the bandwidth of the mobile network is increased from 5 MHz of the 3G network specification to 10 MHz of the 3.5G DC-HSPA+ specification, then increased from the 10 MHz of the 3.5G DC-HSPA+ specification to the 20 MHz of the 3.9G LTE specification, and increased from the 20 MHz of the 3.9G LTE Category 4 specification to 100 MHz of the 4G LTE-A Category 8 specification. The increase in bandwidth shows a proportionate increase in the transmission rates.

2. Increasing the system spectrum efficiency. The increase in spectrum efficiency is mainly achieved through the introduction of new technology, such as the third generation (3G) mobile network which has a maximum spectrum efficiency of 0.4 bit/sec/Hz, the 3.5G mobile network which has a maximum spectrum efficiency of 4.2 bit/sec/Hz, the 3.9G mobile network which has a maximum spectrum efficiency of 7.5 bit/sec/Hz, and the 4G mobile network which has a maximum spectrum efficiency of 30 bit/sec/Hz.

3. Increasing the density of platform distribution or the establishment of small cells. As wireless transmission resources are of a shared nature, the fewer number of people sharing the resources, the more air-time, frequency and space resources will therefore be available, and the transmission rates can be faster. By increasing the density of platforms or small cells established, this effect may be achieved.

Among the three aforementioned technical methods of increasing network capacity and transmission rates, the method of increasing network bandwidth is the simplest and most effective. The wireless network transmission method and device proposed in the invention adopts the first method of increasing network bandwidth to increase the transmission rates of the terminal.

In US Publication US20130322347 A1, "Leveraging multiple access technologies simultaneously", a similar concept is mentioned where a form of core network solution uses a special enhanced packet data gateway (ePDG) to introduce Wi-Fi transmission into the mobile network and integrates the Wi-Fi and mobile transmissions in the core network to achieve an added effect. However, this patent publication does not provide the technology for using both mobile and Wi-Fi transmissions simultaneously while receiving network traffic. US Publication 20130242897, "System and method for heterogeneous carrier aggregation" mentions another similar concept that allows for concurrent mobile network and Wi-Fi reception and transmission but the single information stream only allows for either mobile network or Wi-Fi network, and the DHCP function of the Wi-Fi module of the terminal must also be disabled and a mobile network IP address must be allocated to the Wi-Fi module of the terminal. It has a high level of complexity and its functions are not calibrated for the accelerated application of single information stream.

As such, the aforementioned practices still have many shortcomings, and are not a well-improved design. It therefore requires further improvements.

Based on the inadequacies present in the aforementioned practice, the inventor of this design has thought hard for improvements and innovations, and after spending many years of research, the inventor has finally developed the Heterogeneous Network Integrating Method and Device.

SUMMARY OF THE INVENTION

An aim of the invention is to provide a form of heterogeneous network integrating method and device that will establish a technology for the downlink traffic of both mobile and wireless transmission networks in environments where there is an overlap in the scopes of both networks. When the heterogeneous network integration terminal needs to conduct a downlink traffic, the terminal can open the mobile network and wireless network air interface, and use both mobile network and wireless network technology simultaneously to conduct the downlink traffic so as to achieve improvements in faster transmission rates and reduced user waiting time.

As a form of heterogeneous network integration method and device, it allows the simultaneous use of mobile network and wireless network to conduct downlink traffic in environments where there is an overlap in the scopes of both networks so as to increase transmission speeds. In particular, it refers to the routing of the downlink traffic by the heterogeneous network router at the network end through the wireless router to be transmitted as wireless transmission to the heterogeneous network integration terminal to facilitate the downlink traffic of the heterogeneous network integration terminal via the mobile and wireless networks. The heterogeneous network integration method that achieved the aforementioned aim of invention is due to the heterogeneous network integration function of the heterogeneous network integration terminal. It establishes simultaneous connections with the heterogeneous network router and the wireless router, and maintains the connection records of the wireless router in the element managing system. The heterogeneous network integration terminal will report the Layer 2 (information connection layer) identification address of the terminal itself to the heterogeneous network router through the mobile network. The heterogeneous network router will periodically or non-periodically send queries to the element managing system to request the online terminal list. If the Layer 2 (information connection layer) identification address of the wireless network reported by the terminal matches the information of the online terminal list, then it returns a response that the heterogeneous network integration terminal can provide heterogeneous network integration services. When the heterogeneous network integration terminal conducts downlink traffic to the heterogeneous network router, the routing will be conducted by the internal heterogeneous network controller in the heterogeneous network router. The heterogeneous network controller will transmit some of the downlink traffic via mobile network transmission while other traffic packets will be transferred as wireless transmissions using wireless routers through broadband modems to the heterogeneous network integration terminals. The heterogeneous network integration terminals will use both mobile network and wireless networks at the same time to conduct the downlink traffic and use the heterogeneous network integrators to re-assemble the downlink traffic.

The heterogeneous network integration method and device includes A) one broadband modem, to connect the heterogeneous network router and the wireless router together, and connect the heterogeneous network router to the mobile core network; B) one heterogeneous network router, to provide terminal mobile network services. The heterogeneous network router has a heterogeneous network controller which can use related technology to conduct the downlink traffic to the mobile network air interface, and direct the downlink traffic through the wireless router to be transmitted to the heterogeneous network integration terminal via wireless transmissions; C) at least one wireless router, to provide terminal wireless network services; D) at least one element managing system, to provide the online terminal list of the wireless router; E) one heterogeneous network integration terminal, which has a heterogeneous network integrator to reassemble the downlink traffic to be transmitted via the mobile network and wireless network.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 3 is the Ethernet II frame format.

FIG. 4 is a frame format example of the wireless network Layer 2 identification address transmitted by the heterogeneous network controller to the heterogeneous network integration terminal proposed in the invention.

DETAILED DESCRIPTION OF THE PREFERRED EMBODIMENT

The following description is about embodiments of the present invention; however it is not intended to limit the scope of the present invention.

The invention relates to a form of heterogeneous network integration method and device which is a technology that allows the concurrent downloading of information in environments with an overlapping of the mobile network and wireless network ranges. In particular, the invention refers to the handling of the downlink traffic in heterogeneous network routers where part of the downlink traffic is transmitted to the heterogeneous network integration terminal via the existing wireless router. When the heterogeneous network integration terminal needs to receive the downlink traffic, it may connect to both mobile network and wireless network at the same time. Through the simultaneous transfer of downlink traffic through both mobile network and wireless network, the improvement of accelerated file transfer speeds and reduced user waiting time may be achieved.

Figure 1:
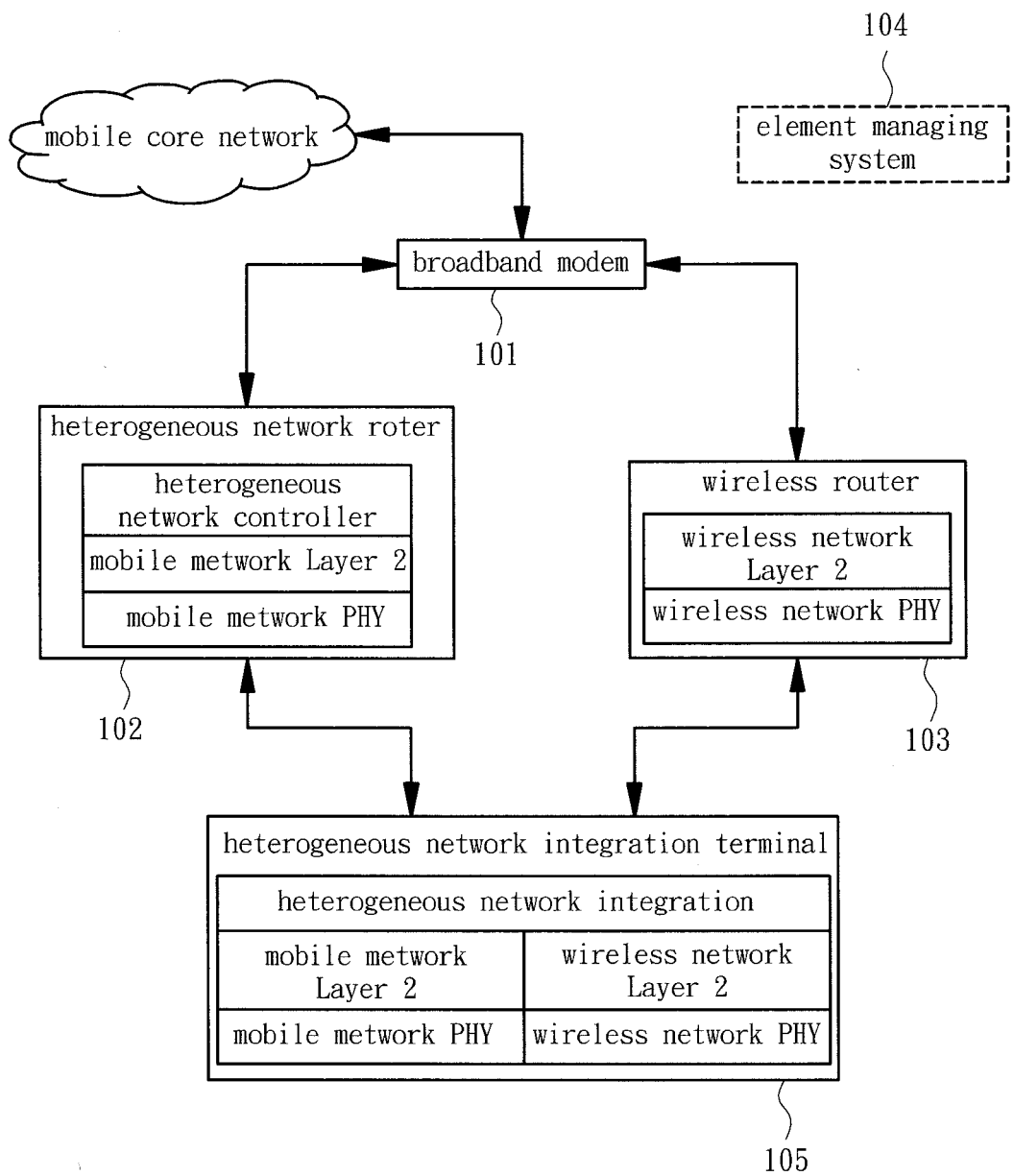
FIG. 1 is a structural diagram of the heterogeneous network integration system in the invention.

Please refer to FIG. 1, which is the structural diagram of the heterogeneous network integration device in the invention. It includes one broadband modem 101, one heterogeneous network router 102, at least one wireless router 103, at least one element managing system 104, and one heterogeneous network integration terminal 105. The broadband modem 101 is used to connect the heterogeneous network router 102 and the wireless router 103 together, and broadband modem 101 is connected to the mobile core network, and is used to direct traffic from the mobile core network to the heterogeneous network router 102. The element managing system 104 may exist within the wireless router 103 or as an external system independent of wireless router 103. The element managing system 104 provides the information of the online terminals of the wireless router 103.

The network interface of broadband modem 101 can be either optic signals or electric signals, and the broadband modem 101 can learn the Layer 2 identification address of the frame source through the frames that pass through. The heterogeneous network router 102 provides terminal mobile network services, and international telecommunication standards have been adopted in the technical specifications of the data transfers such as, for example, CDMA (Code Division Multiple Access), WCDMA (Wideband Code Division Multiple Access), HSPA (High Speed Packet Access), HSPA+ (High Speed Packet Access evolution), LTE (Long Term Evolution), WiMAX (Worldwide Interoperability for Microwave Access), and LTE-A (LTE-Advanced). In addition, the heterogeneous network router 102 can also query the element managing system for the online terminal list of the wireless router.

The wireless router 103 provides terminal wireless network services, and international telecommunication standards have been adopted in the technical specifications of the data transfers, such as Wi-Fi. In addition, the online terminal list of the wireless router 103 should include the wireless network Layer 2 identification address of the online terminals. The element managing system 104 can notify the heterogeneous network router 102 to use the wireless router 103 list for the heterogeneous network integration devices.

The heterogeneous network integration terminal 105 has a heterogeneous network integrator, and the heterogeneous network integration terminal 105 can receive traffic from the mobile network and wireless network. In addition, the heterogeneous network integration terminal 105 can send requests to the heterogeneous network router 102 to activate the heterogeneous network integration function. At the same time, the heterogeneous network integration terminal 105 can report the wireless network Layer 2 (information connection layer) identification address of the heterogeneous network integration terminal 105 to the heterogeneous network router 102. The wireless network Layer 2 of the heterogeneous network integration terminal 105 can transmit the traffic containing the heterogeneous network integration identification codes to the heterogeneous network integrator. The heterogeneous network integrator will reassemble the downlink traffic received through the mobile network and wireless network transmission as routed by the heterogeneous network controller within the heterogeneous network router 103 while the heterogeneous network integration terminal 105 can also allow the broadband modem 101 to learn the wireless network Layer 2 identification address of the heterogeneous network integration terminal 105. The heterogeneous network controller can transfer the downlink traffic to the air interface of the mobile network depending on the mobile network technology, or calibrate the destination address of the downlink traffic as the wireless network Layer 2 identification address of the heterogeneous network integration terminal 105 so that the traffic can be transmitted to the heterogeneous network integration terminal 105 through the broadband modem 101 via wireless transmission through the wireless router 103. The heterogeneous network integration identification codes can be implemented as Ethertype fields in Ethernet II frames, and the calibration of the heterogeneous network integration identification codes should be larger or equal to 0x0600.

Figure 2A:
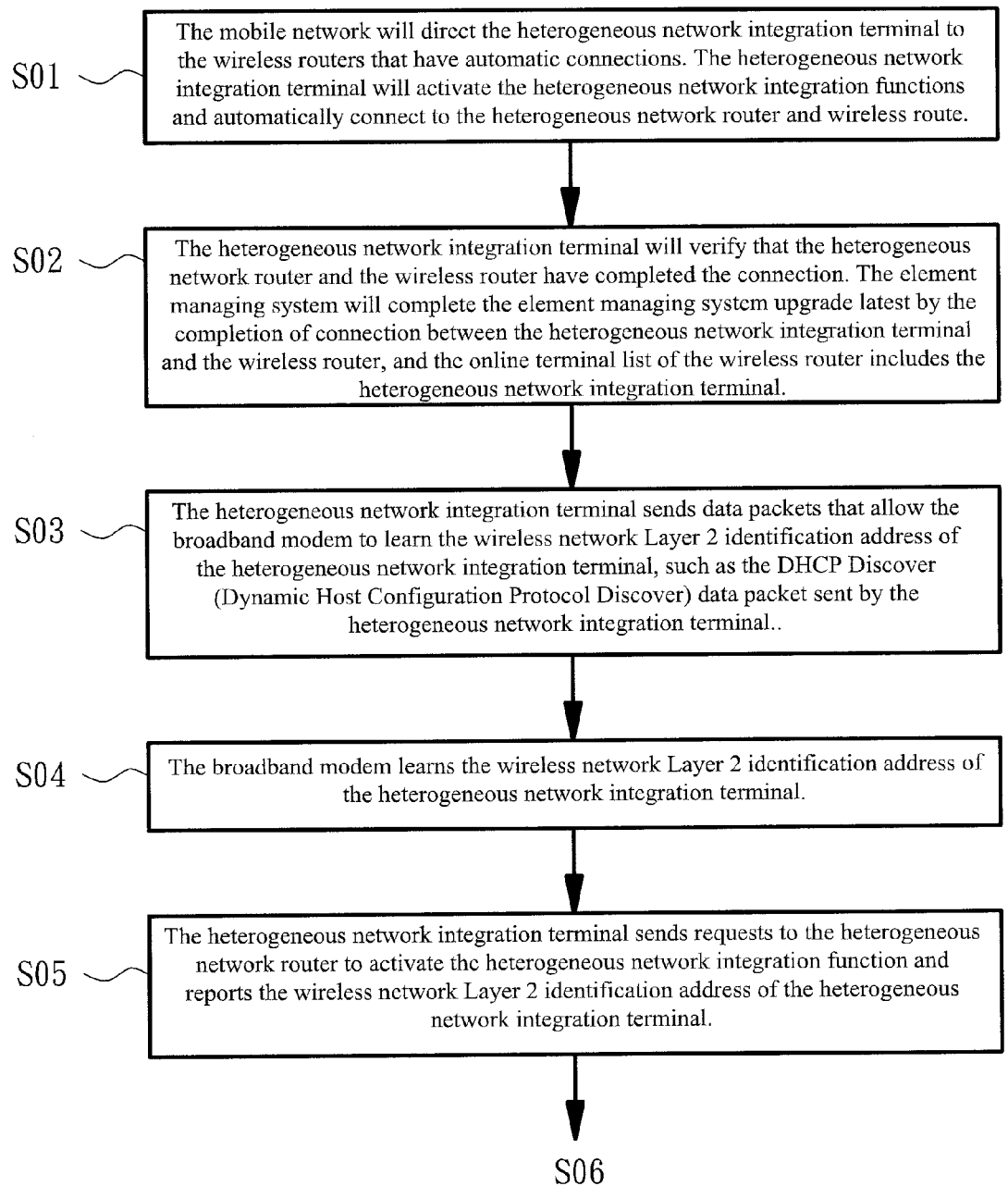
FIGS. 2A-2B are the heterogeneous network integration methods in the invention.
Figure 2B:
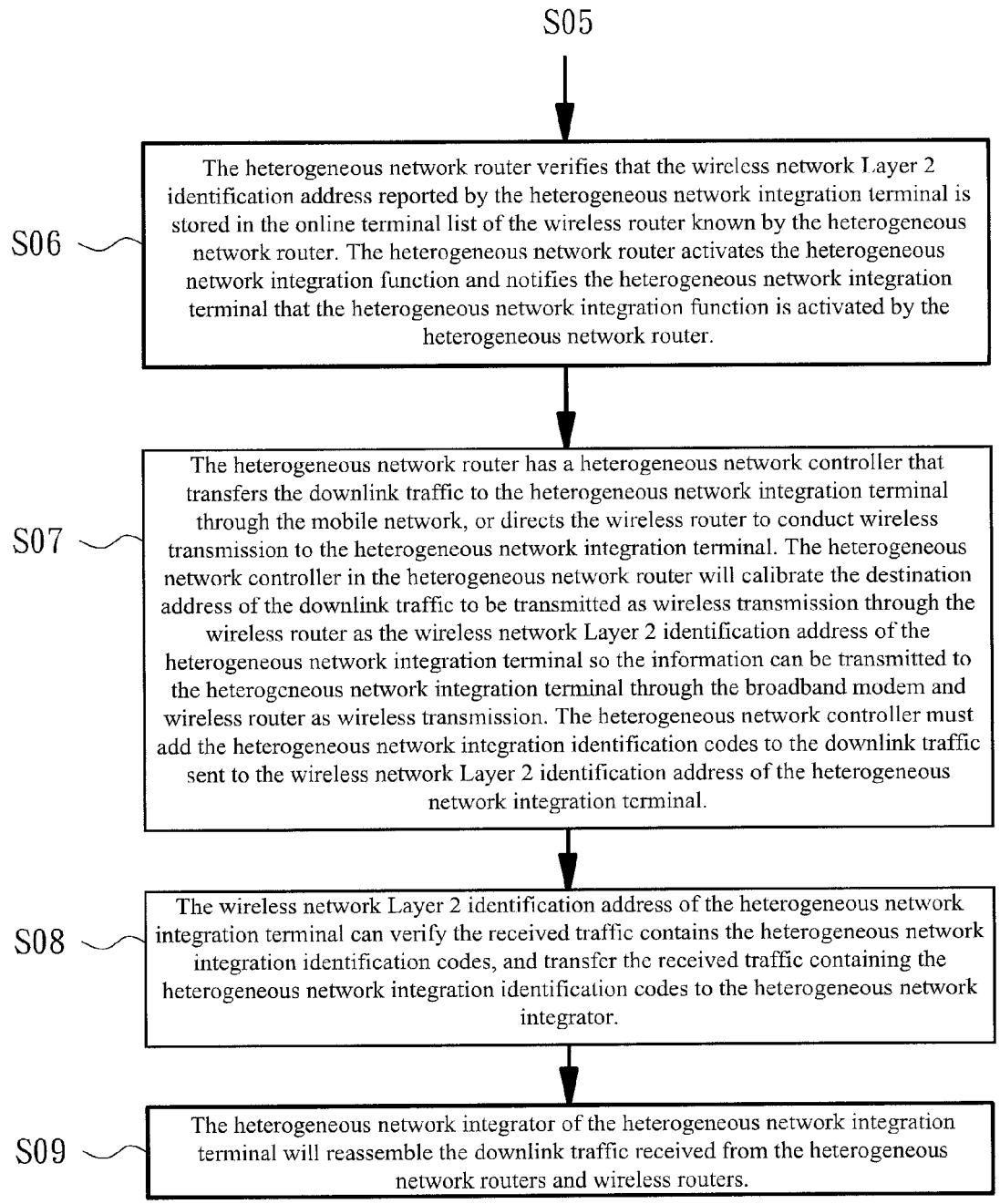

Please refer to FIGS. 2A-2B, which are the heterogeneous network integration methods in the invention. When the heterogeneous network integration terminal 105 activates the heterogeneous network integration function, the heterogeneous network integration terminal 105 will also activate the mobile network and wireless network functions, as well as connect to the heterogeneous network router 102 and wireless router 103 at the same time. The procedures include:

S01: The mobile network will direct the heterogeneous network integration terminal to the wireless routers that have automatic connections. The heterogeneous network integration terminal will activate the heterogeneous network integration functions and automatically connect to the heterogeneous network router and wireless router.

S02: The heterogeneous network integration terminal will verify that the heterogeneous network router and the wireless router have completed the connection. The element managing system will complete the element managing system upgrade latest by the completion of connection between the heterogeneous network integration terminal and the wireless router, and the online terminal list of the wireless router includes the heterogeneous network integration terminal.

S03: The heterogeneous network integration terminal sends data packets that allow the broadband modem to learn the wireless network Layer 2 identification address of the heterogeneous network integration terminal, such as the DHCP Discover (Dynamic Host Configuration Protocol Discover) data packet sent by the heterogeneous network integration terminal.

S04: The broadband modem learns the wireless network Layer 2 identification address of the heterogeneous network integration terminal.

S05: The heterogeneous network integration terminal sends requests to the heterogeneous network router to activate the heterogeneous network integration function and reports the wireless network Layer 2 identification address of the heterogeneous network integration terminal.

S06: The heterogeneous network router verifies that the wireless network Layer 2 identification address reported by the heterogeneous network integration terminal is stored in the online terminal list of the wireless router known by the heterogeneous network router. The heterogeneous network router activates the heterogeneous network integration function and notifies the heterogeneous network integration terminal that the heterogeneous network integration function is activated by the heterogeneous network router.

S07: The heterogeneous network router has a heterogeneous network controller that transfers the downlink traffic to the heterogeneous network integration terminal through the mobile network, or directs the wireless router to conduct wireless transmission to the heterogeneous network integration terminal. The heterogeneous network controller in the heterogeneous network router will calibrate the destination address of the downlink traffic to be transmitted as wireless transmission through the wireless router as the wireless network Layer 2 identification address of the heterogeneous network integration terminal so the information can be transmitted to the heterogeneous network integration terminal through the broadband modem and wireless router as wireless transmission. The heterogeneous network controller must add the heterogeneous network integration identification codes to the downlink traffic sent to the wireless network Layer 2 identification address of the heterogeneous network integration terminal.

S08: The wireless network Layer 2 identification address of the heterogeneous network integration terminal can verify that the received traffic contains the heterogeneous network integration identification codes, and transfer the received traffic containing the heterogeneous network integration identification codes to the heterogeneous network integrator.

S09: The heterogeneous network integrator of the heterogeneous network integration terminal will reassemble the downlink traffic received from the heterogeneous network routers and wireless routers.

Please refer to FIGS. 3-4, in which FIG. 3 is the frame format of the existing technology Ethernet II, and FIG. 4 is a frame format example of the wireless network Layer 2 identification address transmitted by the heterogeneous network controller to the heterogeneous network integration terminal proposed in the invention. In the MAC Destination 301 (Media Access Control Destination) field of the Ethernet II frame format, fill in the wireless network Layer 2 identification address 401 of the heterogeneous network integration terminal. In the MAC Source 302 (Media Access Control Source) field of the Ethernet II frame format, fill in the cable network Layer 2 identification address 402 of the heterogeneous network router. In the Ethertype 303 field of the Ethernet II frame format, fill in the heterogeneous network integration identification code 403. This is so that the wireless network Layer 2 identification address of the heterogeneous network integration terminal 105 can be verified with the heterogeneous network integration identification code 403 for consistency to ensure the received data packets are transmitted from heterogeneous network router 102 and direct the traffic packets to the heterogeneous network integrator. In the Payload 304 field of the Ethernet II frame format, fill in the downlink traffic 404. In the Frame check sequence 305 field of the Ethernet II frame format, fill in the frame check sequence 405. The calculation method for the frame check sequence 405 is similar to frame check sequence 305.

FIG. 4 is an example of the Ethernet II frame format. In order to ensure coexistence with the IEEE 802.3 frame format, the heterogeneous network integration identification code 403 must be larger or equal to 0x0600.

In consideration of the downlink traffic transmitted to the heterogeneous network integration terminal via wireless network as directed by the heterogeneous network controller in the heterogeneous network router, and to conform to the MTU (maximum transmission unit) requirements of the heterogeneous network router, broadband modem and wireless router, the heterogeneous network controller shall set the payload limit of the PDCP packet in the downlink traffic from the wireless network to the heterogeneous network integration terminal below 750. Bytes.

Traditional wireless transmission framework only uses a single wireless communication device for data transmission, and the speed of the data transmission will therefore depend solely on the technical specification and transmission capacities of the wireless communication device. The heterogeneous network integration method and device proposed in the invention utilizes both mobile network and wireless network for transmission of downlink traffic to increase the transfer rate and possesses the following advantages when compared with other existing technologies.

1. The heterogeneous network integration method and device proposed in the invention allows simultaneous use of mobile network and wireless network in the transmission and receiving of downlink traffic to accelerate data transfer rates and reduce user waiting time.

2. The invention can make use of existing wireless and cable routers to reduce the costs of establishment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heterogeneous network integrating device, applied in a communication environment overlapped by a mobile network covering range and a wireless network covering range and using the mobile network and wireless network to transmitting downlink traffic, comprising:
    a heterogeneous network router, comprising at least one heterogeneous network controller which is used to transmit a downlink traffic to a mobile network air interface according to a mobile network technique and divert the downlink traffic to a heterogeneous network integration terminal by a wireless network through at least one wireless router;
    a broadband modem, connected with the heterogeneous network router and the wireless router, and connected to a mobile core network by the heterogeneous network router;
    at least one element managing system, providing online terminal list information of the wireless router;
    wherein, the heterogeneous network integration terminal comprises at least one heterogeneous network integrator and receives the downlink traffic from the heterogeneous network router and the wireless router in the same time.

2. The heterogeneous network integrating device as claimed in claim 1, wherein a network interface of the broadband modem comprises optical signal interface or electronic signal interface.

3. The heterogeneous network integrating device as claimed in claim 1, wherein the broadband modem learns and acquires a layer 2 identification address of frame source according to the through frame.

4. The heterogeneous network integrating device as claimed in claim 1, wherein the broadband modem guides a traffic of the mobile core network to the heterogeneous network router.

5. The heterogeneous network integrating device as claimed in claim 1, wherein a transmission technique specification of a mobile network service provided by the heterogeneous network router comprises CDMA, WCDMA, HSPA, HSPA+, LTE, WiMAX, or LTE-A.

6. The heterogeneous network integrating device as claimed in claim 1, wherein the wireless router provides a terminal wireless network service.

7. The heterogeneous network integrating device as claimed in claim 1, wherein the element managing system is configured in the wireless router, or independent of the wireless router.

8. The heterogeneous network integrating device as claimed in claim 1, wherein the element managing system notifies wireless router list information to the heterogeneous network router, wherein the wireless router in the wireless router list information can be configured to the heterogeneous network integrating device.

9. The heterogeneous network integrating device as claimed in claim 1, wherein the heterogeneous network integration terminal is able to access the mobile network.

10. The heterogeneous network integrating device as claimed in claim 1, wherein the heterogeneous network integration terminal is able to access the mobile network and the wireless network.

11. The heterogeneous network integrating device as claimed in claim 1, wherein the heterogeneous network integration terminal is configured to send a heterogeneous network integrating activating request.

12. The heterogeneous network integrating device as claimed in claim 1, wherein the heterogeneous network integration terminal is configured to report a wireless layer 2 identification address of the heterogeneous network integration terminal to the heterogeneous network router, wherein the wireless network layer 2 identification address is configured to confirm whether the downlink traffic has a heterogeneous network integrating identification code, and transmit a received traffic having the heterogeneous network integrating identification code to the heterogeneous network integrator.

13. The heterogeneous network integrating device as claimed in claim 12, wherein a setting value of the heterogeneous network integrating identification code is greater than or equal to 0x0600.

14. The heterogeneous network integrating device as claimed in claim 1, wherein the heterogeneous network integration terminal configures the broadband modem to learn a wireless network layer 2 identification address of the heterogeneous network integration terminal.

15. The heterogeneous network integrating device as claimed in claim 1, wherein the heterogeneous network controller sets a portion of downlink traffic destination addresses to a wireless network layer 2 identification address of the heterogeneous network integration terminal, and transmits to the heterogeneous network integration terminal using the wireless network by the broadband modem and the wireless router.

16. The heterogeneous network integrating device as claimed in claim 1, wherein the heterogeneous network controller is configured to add a heterogeneous network integrating code to the downlink traffic which is transmitted to a wireless network layer 2 identification address of the heterogeneous network integration terminal.

17. The heterogeneous network integrating device as claimed in claim 16, wherein the downlink traffic which is transmitted to the wireless network layer 2 identification address of the heterogeneous network integration terminal comprises a PDCP packet with a payload less than 750 Byte.

18. The heterogeneous network integrating device as claimed in claim 1, wherein the online terminal list information comprises an online terminal wireless network layer 2 identification address.

19. The heterogeneous network integrating device as claimed in claim 1, wherein the heterogeneous network integrator is configured to reconstruct the received downlink traffic which is assigned to the mobile network and the wireless network by the heterogeneous network controller of the heterogeneous network router.

20. A heterogeneous network integrating method, applied in a communication environment overlapped by a mobile network covering range and a wireless network covering range and using the mobile network and wireless network to transmitting downlink traffic, comprising:
  a) configuring a heterogeneous network integration terminal to enable a heterogeneous network integrating operation which enables the heterogeneous network integration terminal to automatically connect a heterogeneous network router and a wireless router;
  b) configuring the heterogeneous network integration terminal to confirm whether finishing a communication connection with the heterogeneous network router and the wireless router;
  c) configuring an element managing system to update time information after the heterogeneous network integration terminal finishes the communication connection with the wireless router;
  d) configuring the heterogeneous network integration terminal to transmit a packet which is able to make the broadband modem learn a wireless network layer 2 identification address;
  e) configuring the broadband modem to learn the wireless network layer 2 identification address of the heterogeneous network integration terminal;
  f) configuring the heterogeneous network integration terminal to send a heterogeneous network integrating activating request to the heterogeneous network router and report the wireless network layer 2 identification address of the heterogeneous network integration terminal;
  g) configuring the heterogeneous network router to confirm that a wireless network layer 2 identification address had existed in a known wireless router online terminal list information of the heterogeneous network router, configuring the heterogeneous network router to enable heterogeneous network integrating operation, and notifying the heterogeneous network integration terminal that the heterogeneous network router already enables the heterogeneous network integrating operation;
  h) configuring a heterogeneous network controller of the heterogeneous network router to transmit the downlink traffic to the heterogeneous network integration terminal by the mobile network, or diverting to the wireless router to transmit the downlink traffic by the wireless network, wherein the heterogeneous network controller of the heterogeneous network router sets a location address of downlink traffic which is diverted to the wireless router and transmitted to the heterogeneous network integration terminal by the wireless network to the wireless layer 2 identification address, and transmits to the heterogeneous network integration terminal by the wireless network through the broadband modem and wireless router;
  i) configuring the heterogeneous network controller to add the heterogeneous network integrating identification code to the downlink traffic which is transmitted to the wireless network layer 2 identification address of the heterogeneous network integration terminal;
  j) configuring the wireless network layer 2 identification address of the heterogeneous network integration terminal to confirm the received traffic which comprises the heterogeneous network integrating identification code, and transmitting the received traffic having the heterogeneous network identification code to the heterogeneous network integrator; and
  k) configuring the heterogeneous network integrator of the heterogeneous network integration terminal to reconstruct the downlink traffic received from the heterogeneous network router and the wireless router.

21. The heterogeneous integrating method as claimed in claim 20, wherein the wireless router which is automatically connected by the heterogeneous network integration terminal is assigned by a mobile network end.

* * * * *